United States Patent [19]
Lee et al.

[11] Patent Number: 5,459,166
[45] Date of Patent: Oct. 17, 1995

[54] CATALYTIC PROCESS FOR PRODUCTION OF GASOLINE FROM SYNTHESIS GAS

[75] Inventors: Sunggyu Lee; Makarand R. Gogate, both of Akron; Kathy L. Fullerton, Cuyahoga Falls, all of Ohio; Conrad J. Kulik, Newark, Calif.

[73] Assignee: Electric Power Research Institute, Inc., Palo Alto, Calif.

[21] Appl. No.: 316,683

[22] Filed: Sep. 30, 1994

[51] Int. Cl.⁶ ............................................. C07C 1/04
[52] U.S. Cl. .................. 518/700; 518/713; 518/715; 518/719
[58] Field of Search ............................ 518/700, 713, 518/715, 717, 719

[56] References Cited

U.S. PATENT DOCUMENTS

| | | | |
|---|---|---|---|
| 4,617,320 | 10/1986 | Coughlin et al. | 518/719 |
| 4,728,672 | 3/1988 | Yoshinari et al. | 518/717 |
| 4,857,559 | 8/1989 | Eri et al. | 518/700 |
| 4,978,689 | 12/1990 | Bell et al. | 518/709 |
| 5,227,407 | 7/1993 | Kim | 518/700 |
| 5,389,689 | 2/1995 | Fujimoto et al. | 518/700 |

*Primary Examiner*—Werren B. Lone
*Attorney, Agent, or Firm*—Fish & Richardson

[57] ABSTRACT

A process is provided whereby syngas is converted to gasoline via a liquid-phase process producing dimethyl ether as an intermediate.

9 Claims, No Drawings

CATALYTIC PROCESS FOR PRODUCTION OF GASOLINE FROM SYNTHESIS GAS

The present invention relates to the production of gasoline from synthesis gas (syngas) through dimethyl ether as an intermediate.

BACKGROUND OF THE INVENTION

There are methods known in the art for producing gasoline from synthesis gas such as the method disclosed in U.S. Pat. No. 3,894,102, however there is a need for improvement in the productivity, heat transfer, reactor size and other significant parameters which can lead to cost efficiency. One of the disadvantages of the process of U.S. Pat. No. 3,894,102 is that it is economically justified only if the syngas feed stock is hydrogen-rich. A more versatile process is desirable. Furthermore, in the prior art process, in the first stage of conversion of the syngas to methanol, a significant amount of water is produced which must be separated from the mixture prior to proceeding to the gasoline synthesis stage.

Other processes related to syngas-to-gasoline conversion include U.S. Pat. No. 4,882,360 describing a process for producing an alcohol fraction comprising methanol, ethanol and some propanol from a syngas using a catalyst consisting of three components: molybdenum sulfide, iron sulfide and a suitable promoter. This does not appear to be a process wherein syngas is made to produce dimethyl ether which is in turn converted to gasoline.

U.S. Pat. No. 4,826,662 discloses an apparatus for reducing the amount of water in the feed to a methanol-to-gasoline reactor. In the first step, methanol is converted to an equilibrium mixture of dimethyl ether, water and methanol and the patent is directed to the reduction of the amount of water in this mixture. Since the presence of water in a gasoline reactor is detrimental in that it deactivates the catalysts irreversibly and limits the maximum temperature at which the reactor can operate due to the amount of steam produced in the reactor effluent, the patent provides a set of primary and secondary distillation towers to dewater the feed. According to the present invention the feed stock is a syngas which produces directly dimethyl ether in a one-step synthesis which obviates the need for dewatering according to this patent.

U.S. Pat. No. 4,814,536 discloses an improvement on the process of converting methanol to gasoline by selectively programming a feed weight hourly space velocity (WHSV) to a fixed bed catalytic conversion reactor so as to increase cycle average gasoline yield and increase useful life in the conversion catalyst.

U.S. Pat. No. 4,898,717 discloses a multistage process for converting $C_1$–$C_4$ aliphatic oxygenares to heavy hydrocarbons in the diesel fuel boiling range. In the first stage the feed is converted to lower olefins and in the second stage the ethane-free lower olefins are converted to diesel fuel boiling range hydrocarbons.

U.S. Pat. No. 4,808,764 describes a method for feeding vaporized methanol into a gasoline reactor in contact with a recycled gas stream as a diluent. By using a proper dilution ratio, the exothermic heat of reaction and adiabatic temperature rise in the gasoline reactor are controlled within tolerable limits for the zeolite catalyst.

U.S. Pat. Nos. 4,788,369 and 4,788,042 are directed to gasoline conversion systems where a light hydrocarbon diluent is recycled.

U.S. Pat. No. 4,606,580 is directed a two-stage Fischer-Tropsch synthesis for the production of diesel and gasoline hydrocarbons from syngas.

U.S. Pat. Nos. 5,524,227 and 5,524,228 are directed to the production of durene and gasoline from syngas using a conventional methanol-to-gasoline process. Syngas is converted a mixture of durene and gasoline in two steps where the durene is separated from the gasoline by cooling and crystallization.

U.S. Pat. No. 4,444,652 is directed to the production and upgrading of low grade gasoline derived from syngas over an iron or cobalt catalyst. Low grade gasoline is upgraded with a $C_3$ to $C_4$ aliphatic hydrocarbon stream over a gallium-impregnated zeolite catalyst.

U.S. Pat. No. 4,399,234 is directed to production of gasoline via Fischer-Tropsch synthesis over cobalt/alumina catalysts.

U.S. Pat. No. 4,263,141 is directed to the production of gasoline from syngas using a conventional methanol-to-gasoline route in two stages. In the first stage syngas is converted to methanol over a copper based catalyst. Then the entire product stream is fed to a gasoline reactor the product of which is cooled and the $C_5$ and higher gasoline fraction is collected as a product.

It is therefore an object of the present invention to provide a method for converting syngas, either hydrogen-rich or carbon monoxide-rich, to gasoline through an intermediate which comprises as a major portion dimethyl ether, which improves the reaction chemistry, productivity and heat transfer as compared to processes which utilize methanol as an intermediate.

It is a further object of the present invention to provide an improved process for converting syngas to gasoline whereby the lowering of the energy requirements is by about 15% or more as compared to a process utilizing methanol as an intermediate.

These and other objects will be apparent from the following description of the practice of the invention.

SUMMARY OF THE INVENTION

A process is provided for the liquid-phase production of gasoline from a gas comprising carbon oxides and hydrogen, comprising the step of contacting the gas with a catalyst slurry at a temperature in the range of about 200° to 285° C., at a pressure in the range of about 700 to 1600 psig, wherein the slurry comprises a mixture of a first catalytic component comprising copper and zinc oxide supported on alumina, zirconia and/or titania; and a second catalytic component comprising γ-alumina; the weight ratio of the first catalyst component to the second catalyst component being in the range of 100 to 1; and then contacting the resulting product which comprises as a major component thereof dimethyl ether, with a zeolite catalyst in a temperature range from about 650° F. to 1000° F. under such a combination of conditions as to produce a product which comprises an organic portion which is predominantly liquid hydrocarbons boiling in the range $C_5$ to 400° F. range.

DESCRIPTION OF THE PREFERRED EMBODIMENTS

The chemistry of methanol synthesis from normal syngas may be characterized by the following equations (1) and (2):

  (1)

  (2)

The water that is produced in situ in the catalyst by reaction (1) reacts rapidly with the carbon monoxide present in the syngas feed, resulting in formation of carbon dioxide and hydrogen, both of which are reactants for the main synthesis reaction (1). As a result, the water produced in situ does not accumulate in the Catalyst and does not adversely affect the thermodynamic equilibrium considerations. However, the production of methanol does adversely affect the thermodynamics of reactions (1) and (2). However, by mixing in the slurry a dehydration catalyst, such as γ-alumina, the additional reaction takes place:

$$2CH_3OH = CH_3OCH_3 + H_2O \qquad (3)$$

By reaction (3), more methanol is consumed and water is generated along with dimethyl ether. Since the in situ water is useful, as discussed above, and the in situ consumption of methanol via reaction (3) reduces the methanol concentration within the catalyst, the overall thermodynamic equilibrium of conversion of syngas is improved.

The catalysts comprising the catalysts for converting the syngas to dimethyl ether in the first stage will be those known in the art which usually comprise copper, zinc oxide and alumina, zirconia and/or titania supports. Such catalysts are disclosed, for example, in U.S. Pat. No. 4,417,000. A particularly preferred catalyst comprises copper (measured as the metal) ranging from about 25% to about 65% by weight, basis total catalyst, more preferably ranging from about 35% to 55% by weight. The zinc oxide (as measured by the metal oxide) will range from about 35% by weight to about 65% by weight of the total catalyst, and preferably from about 40% by weight to 50% by weight. The support will usually be an alumina support but may also be titania or zirconia.

The co-catalyst which is used to convert the methanol to dimethyl ether will be a dehydration catalyst such as γ-alumina, zeolite, or aluminum silicate. The weight ratio of the methanol-producing catalyst to the dimethyl ether-producing catalyst in the slurry will be about 100 to 1, more preferably from 50 to 1.

The first stage catalysts may be intimately admixed together in a single bed or may be in two successive beds or in a series of alternating layers. The first stage reaction zone may be operated as a fixed or fluidized bed with upflow or downflow of reactants and conventional product removal. Typically, the first stage reaction product will comprise dimethyl ether as a major component. Some water (some in the form of steam) and some unreacted carbon monoxide hydrogen and carbon dioxide appeared. A small amount of methanol may also be present.

The organic intermediates comprising essentially dimethyl ether formed in the first stage are then fed into the second stage, preferably with a minimum of interstage cooling. In the second stage the catalysts are zeolites which are useful for converting hydrocarbons to gasoline, which is a fuel comprising liquid hydrocarbons in the range of $C_5$ to about 400° F. boiling point. These zeolite catalysts which are referred are those disclosed in U.S. Pat. No. 3,894,102 and in particular are zeolite catalysts having a silica to alumina ratio of at least 12 and preferably higher ratios to at least about 60. The disclosure of U.S. Pat. No. 3,894,102 is incorporated by reference herein in its entirety.

The zeolites, when prepared in the presence of organic cations, are catalytically inactive but may be activated by heating in an inert atmosphere, preferably at 1000° F. for 1 hour followed by a base exchange with ammonium salts and calcination at 1000° F. in air. More generally, it is desirable to activate this type of zeolite catalyst by base exchange with ammonium salts followed by calcination in air at about 1000° F. for from about 15 minutes to 24 hours.

In the practice of the present invention, a slurry will be formed for the first stage as a conventional liquid-phase catalyst, i.e., containing about 10 to 40% by weight of total catalyst in an oil slurry comprising oils such as Witco® 40, Witco® 70 and Freezene® 100. The temperature and pressure of the reactor containing the catalytic slurry may be varied, depending upon the final process objectives. In general it will be preferable to utilize a small amount of the dehydration (dimethyl ether forming) catalyst, usually about 2 to 10% by weight of the total catalyst. Since γ-alumina is the preferred co-catalyst, most suitable γ-alumina is that having a high surface area, i.e., usually at least about 100 $m^2/g$. The γ-aluminas which are useful in the present invention are readily available commercially. Typical temperatures for reacting syngas in the reactor to form methanol and dimethyl ether range from about 200° C. to 285° C. Typical pressures are from 750 to 1200 psig. In general, a preferred temperature is about 220° to 270° C. at a pressure of around 1000 psig. The total amount of catalyst utilized will depend in part upon the size of the reactor, but typically about 50 to 200 grams of catalyst in a 1 liter reactor will be appropriate and can be scaled upwards from this base point. Generally, given identical temperatures and pressures, the higher the ratio of the methanol catalyst to dehydration catalyst, the more efficient and the greater the yield is of dimethyl ether as compared to methanol.

The intermediate product comprising dimethyl ether as a major product is converted then to a hydrocarbon product, typically comprising liquid hydrocarbons boiling at $C_5$ to 400° F. range, by contacting the product of stage 1 with the zeolite catalysts at a temperature in the range of 650° to 1000° F. Typical space velocities (calculated on dimethyl ether) of contact are from 0.1 to 50 kg DME/kg cat/hr.

The particular advantages of the present process are that the total reaction time of conversion of the syngas to gasoline is reduced and the space velocity which may be utilized with a catalyst is increased. Furthermore, if desired the reactor size may be much smaller than utilized in systems in which methanol is a primary product since volumetrically one mole of dimethyl ether is approximately equivalent of 2 moles of methanol in hydrocarbon value.

Production of water in the first stage of the present invention is low, which is also an advantage in that the small amount of water can be handled by reaction with carbon monoxide to produce more reactants, that is carbon dioxide and hydrogen, favored by a forward water gas shift reaction.

Furthermore, according to the present invention the equilibrium conversion of dimethyl ether to gasoline is higher than the conversion to gasoline when there is a mixed feed of substantial amounts of dimethyl ether, methanol and water. Moreover, since the intermediate in the present invention is primarily dimethyl ether, the necessity of separating methanol and water intermediate products, made according to the prior art, is eliminated therefore saving on the thermal usage of the overall process.

Finally, the versatility of the catalysts used to convert the natural gas to dimethyl ether is such that the hydrogen-rich or carbon monoxide-rich source of syngas may be utilized, which is a significant advantage over the prior art in which economic operation is limited to the use of hydrogen-rich syngas sources.

The following examples are given by way of illustration and are not intended to limit the invention in any way.

EXAMPLE 1

Dimethyl ether, synthesized from syngas on copper and zinc oxide supported on aluminum in the presence of γ-alumina, is contacted with zeolite catalysts according to the present invention in a fluidized bed reactor. The reaction temperature was kept at 395° C. and 2.3 atm and the space velocity (calculated on DME) was kept at 2.4 kg DME/kg cat/hr.

The catalyst used was a zeolite ZSM-5, with a silica to alumina ratio of 50. In the laboratory, nitrogen was co-fed to the reactor and all product gas analysis was conducted by a gas chromatograph equipped with flame ionization detector (FID) and a packed column. The aqueous and liquid hydrocarbon products are analyzed by the same gas chromatography along with a capillary column.

The yield based on the feed DME mass and the analysis of hydrocarbon gas products are shown below.

| Yields, mass % DME fed | | |
|---|---|---|
| | mass % | mass (g) |
| Hydrocarbons (liquid) | 47.6 | 4.42 |
| Hydrocarbons (gas) | 12.9 | 1.20 |
| Water | 39.5 | 3.67 |
| | 100 | 9.29 |

They hydrocarbon conversion from DME is 60.5%, which is 99.5% of the theoretical maximum hydrocarbon conversion (60.8%).

| | mass % |
|---|---|
| Hydrocarbon Gaseous Product Analysis | |
| Methane | 29.3 |
| Ethane + Ethylene | 17.8 |
| Propane | 9.8 |
| Propene | 10.9 |
| Isobutane | 6.6 |
| N-Butane | 2.7 |
| Butenes | 17.1 |
| Isopentane | 2.4 |
| Others | 3.4 |
| | 100 |
| Hydrocarbon Liquid Product Analysis | |
| $C_5$ | 11.7 |
| $C_6$ | 14.6 |
| $C_7$ | 13.6 |
| $C_8$ | 26.8 |
| $C_9$ | 20.6 |
| $C_{10}$ | 1.6 |
| Others | 11.1 |
| | 100 |

EXAMPLE 2

Dimethyl ether produced by the operation of a mechanically agitated slurry reactor for a liquid phase DME process, is contracted with the zeolite catalysts in a packed bed reactor. The reaction temperature was kept at 430° C. at a pressure of 1.7 arm, and with a space velocity of 1.4 kg DME/kg cat/hr. The duration of the run was 2 hours. The catalyst used was a ZSM-5, with a silica to alumina ratio of 50. In the laboratory, nitrogen was also fed to the reactor and all vent gas was analyzed by a gas chromatograph equipped with flame ionization detector (FID). The liquid products are analyzed by the same gas chromatograph equipped with a capillary column.

The yields based on the feed DME mass and the analysis of hydrocarbon gas products are shown below:

| Yields, mass % DME fed | | |
|---|---|---|
| | mass % | mass (g) |
| Hydrocarbons (liquid) | 52.5 | 5.28 |
| Hydrocarbons (gas) | 8.6 | 0.86 |
| Water | 38.9 | 3.91 |
| | 100 | 10.05 |

The theoretical hydrocarbon conversion from DME is 60.8%. Therefore, the current experimental results show complete conversion (61.1%).

| Hydrocarbon Gaseous Product Analysis | |
|---|---|
| | mass % |
| Methane | 8.7 |
| Ethane + Ethylene | 23.3 |
| Propane + Propene | 13.2 |
| Isobutane | 19.4 |
| N-Butane | 8.6 |
| Butenes | 14.3 |
| Isopentane | 6.4 |
| Others | 6.1 |
| Total | 100 |

| Hydrocarbon Liquid Product Analysis | |
|---|---|
| | mass % |
| $C_5$ | 6.4 |
| $C_6$ | 12.2 |
| $C_7$ | 17.0 |
| $C_8$ | 27.6 |
| $C_9$ | 20.1 |
| $C_{10}$ | 3.9 |
| Others | 12.8 |
| Total | 100 |

| Catalyst Used | |
|---|---|
| Type | ZSM-5 |
| Manufacturer | PQ Corporation |
| Particle Size | 147 microns |
| Particle Density | 1.6 g/cm$^3$ |
| Surface Area | 350 m$^2$/g |
| Al/Si | 50 |

The process of the invention has been described generally and by example with reference to the above-described preferred embodiments. However, from the foregoing it will be apparent to those skilled in the art that various modifications of the process and materials used disclosed herein can be made without departure from the spirit of the invention.

It is claimed:

1. A process for the liquid-phase production of gasoline from a syngas comprising carbon oxides and hydrogen, comprising the steps of (a) contacting said gas with a catalyst slurry at a temperature in the range of about 200° to 285° C. and pressure in the range of about 700 to 1600 psig to produce a liquid product comprising dimethyl ether as a major component thereof, wherein said slurry comprises a mixture of a first catalytic component comprising copper and zinc oxide, supported on alumina, zirconia and/or titania; and a second catalytic component comprising a dehydration catalyst; the weight ratio of said first catalytic component to said second catalytic component being in the range of 100 to 1; (b) contacting said liquid product from Step (a) with a zeolite catalyst at a temperature in the range of about 650° to 1000° F. under such conditions as to produce a product having an organic portion which is predominantly liquid hydrocarbons boiling in the $C_5$ to 400° F. range.

2. A process according to claim 1 wherein said syngas is hydrogen-rich.

3. A process according to claim 1 wherein said syngas is carbon monoxide rich.

4. The process according to claim 1 wherein said catalyst ratio is from 50 to 1.

5. The process according to claim 1 wherein said temperature is in the range of 220° to 270° C.

6. The process according to claim 5 wherein said temperature is about 260° C.

7. The process according to claim 1 wherein said pressure is in the range of about 750 to 1200 psig.

8. The process according to claim 7 wherein said pressure is about 1000 psig.

9. The process according to claim 1 wherein said dehydration catalyst comprises γ-alumina.

* * * * *

UNITED STATES PATENT AND TRADEMARK OFFICE
CERTIFICATE OF CORRECTION

PATENT NO.  : 5,459,166

DATED       : October 17, 1995

INVENTOR(S) : Sunggyu Lee, Makarand R. Gogate, Kathy L. Fullerton and Conrad J. Kulik It is certified that error appears in the above-identified patent and that said Letters Patent is hereby corrected as shown below:

Title Page: Attorney, Agent, or Firm —change "Fish & Richardson" to --Fish & Richardson P.C.--.

Column 1, line 52: change "oxygenares" to --oxygenates--.

Column 1, line 67: after the word "directed", insert the word --to--.

Column 2, line 6: after the word "converted", insert the word --to--.

Column 5, line 66: change "arm" to --atm--.

Signed and Sealed this

Fifth Day of November, 1996

Attest:

BRUCE LEHMAN

*Attesting Officer*  *Commissioner of Patents and Trademarks*